(12) United States Patent
Linsky (10) Patent No.: US 9,030,971 B2
(45) Date of Patent: May 12, 2015

(54) SIMULTANEOUS OPERATION OF SHORT RANGE WIRELESS SYSTEMS WITH A MOBILE WIRELESS BROADBAND SYSTEM

(75) Inventor: Joel Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 13/009,178

(22) Filed: Jan. 19, 2011

(65) Prior Publication Data

US 2012/0020258 A1 Jan. 26, 2012

Related U.S. Application Data

(60) Provisional application No. 61/366,134, filed on Jul. 20, 2010.

(51) Int. Cl.
*H04J 3/00* (2006.01)
*H04W 72/12* (2009.01)
*H04W 74/00* (2009.01)

(52) U.S. Cl.
CPC ........ *H04W 72/1215* (2013.01); *H04W 74/002* (2013.01)

(58) Field of Classification Search
CPC .................. H04W 72/1215; H04W 74/002
USPC ............... 370/280, 329, 343, 431; 455/67.11, 455/552.11
See application file for complete search history.

(56) References Cited

U.S. PATENT DOCUMENTS 5,544,075 A * 8/1996 Janex ........................... 370/230
7,620,021 B1 * 11/2009 Chen et al. ................... 370/337
8,170,482 B2   5/2012 Linsky
8,416,803 B1 * 4/2013 Basson et al. ................. 370/465
2003/0012176 A1 * 1/2003 Kondylis et al. .............. 370/348
2006/0045133 A1 * 3/2006 Temple et al. ................. 370/498
2007/0243874 A1 * 10/2007 Park et al. ..................... 455/442

(Continued)

FOREIGN PATENT DOCUMENTS

JP     2010522448 A    7/2010
JP     2010541307 A    12/2010

(Continued)

OTHER PUBLICATIONS

"3GPP; Technical Specification Group Radio Access Network; Evolved Universal Terrestrial Radio Access (E-UTRA); TDD Home eNodeB (HeNB) Radio Frequency (RF) requirements analysis (Release 9)", 3GPP TR 36.922 V9.1.0 (Jun. 2010), 74 pages.*

(Continued)

*Primary Examiner* — Brian J Gillis
*Assistant Examiner* — Amy Ling
(74) *Attorney, Agent, or Firm* — Kevin T. Cheatham (57) ABSTRACT

Simultaneous operation of a short-ranged time division duplex (TDD) system with a mobile wireless broadband system may be implemented through scheduling and aligning both sets of communications. After determining a TDD frame configuration of the mobile wireless broadband system, a slot map is generated identifying slot-size selection information for each slot in the TDD frame configuration available for simultaneous operation. The slot-size selection information aligns the communication packet structure of the short-ranged TDD system and the uplink/downlink boundary of the TDD frame configuration. The communication device then transmits the slot map to a short-ranged TDD device for establishing the simultaneous operation.

15 Claims, 8 Drawing Sheets

(56) References Cited

U.S. PATENT DOCUMENTS

| | | | |
|---|---|---|---|
| 2007/0274272 A1* | 11/2007 | Joshi et al. | 370/338 |
| 2007/0275746 A1* | 11/2007 | Bitran | 455/509 |
| 2008/0080448 A1* | 4/2008 | Rottinghaus | 370/342 |
| 2008/0130603 A1* | 6/2008 | Wentink et al. | 370/338 |
| 2009/0225717 A1* | 9/2009 | Banerjea | 370/329 |
| 2010/0061326 A1* | 3/2010 | Lee et al. | 370/329 |
| 2010/0246456 A1* | 9/2010 | Suo et al. | 370/280 |
| 2010/0265874 A1* | 10/2010 | Palanki et al. | 370/315 |
| 2011/0002243 A1* | 1/2011 | Sherman et al. | 370/280 |
| 2011/0076945 A1* | 3/2011 | Chang et al. | 455/41.2 |
| 2011/0116490 A1* | 5/2011 | Wilhelmsson et al. | 370/343 |
| 2011/0122780 A1* | 5/2011 | Nieminen et al. | 370/252 |
| 2012/0071106 A1* | 3/2012 | Kadous et al. | 455/67.11 |

FOREIGN PATENT DOCUMENTS

| | | |
|---|---|---|
| JP | 2011507337 A | 3/2011 |
| JP | 2011530251 A | 12/2011 |
| WO | WO-2009033826 A1 | 3/2009 |
| WO | WO-2009076018 A2 | 6/2009 |
| WO | WO-2010014992 A1 | 2/2010 |
| WO | WO2010025678 A1 | 3/2010 |

OTHER PUBLICATIONS

"IEEE Standard for Local and metropolitan area networks, Part 16: Air Interface for Fixed Broadband Wireless Access", IEEE P802/16h/D14, Jan. 2010, 212 pages.*

"IEEE Standard for Information technology—Telecommunications and information exchange between systems—Local and metropolitan area networks—Specific requirements; Part 15.1: Wireless medium access control (MAC) and physical layer (PHY) specifications for wireless personal area networks (WPANs)"; IEEE Std 802.15.1-2005, 600 pages.*

CMCC: "Kickoff for SI on interference avoidance for in-device coexistence", 3GPP Draft; R2-103949 Kick-Off of SI on Interference Avoidance for In-Device Coexistence, 3rd Generation Partnership Project (3GPP), Mobile Competence Centre 650, Route Des Lucioles ; F-06921 Sophia-Antipolis CEDEX ; France, vol. RAN WG2, No. Stockholm, Sweden; 20100628, Jun. 22, 2010, XP050451305, [retrieved on Jun. 22, 2010].

International Search Report and Written Opinion—PCT/US2011/044756—ISA/EPO—Nov. 11, 2011.

* cited by examiner

SIMULTANEOUS OPERATION OF SHORT RANGE WIRELESS SYSTEMS WITH A MOBILE WIRELESS BROADBAND SYSTEM

CLAIM OF PRIORITY UNDER 35 U.S.C. §119

The present application for patent claims the benefit of U.S. Provisional Patent Application No. 61/366,134, entitled "Simultaneous Operation of Short Ranged TDD Wireless Systems with a Mobile Wireless Broadband System" filed Jul. 20, 2010, and assigned to the assignee hereof and hereby expressly incorporated by reference herein.

BACKGROUND

1. Field

Aspects of the present disclosure relate generally to wireless communication systems, and more particularly, to simultaneous operation of short range wireless systems with a mobile wireless broadband system.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (or evolved node Bs (eNBs)) that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method is provided for simultaneous operation of a short-ranged time division duplex (TDD) mobile wireless system (MWS) with a mobile wireless broadband system. The method includes determining a timing configuration of the mobile wireless broadband system. The method also includes generating, based on the timing configuration, a time slot map identifying transmitting and receiving opportunities that enable simultaneous operation of the wireless systems while mitigating interference between the wireless systems.

In another aspect, an apparatus for simultaneous operation of a short-ranged time division duplex (TDD) mobile wireless system (MWS) with a mobile wireless broadband system has a memory, and at least one processor coupled to the memory and configured: to determine a timing configuration of the mobile wireless broadband system. The processor(s) is also configured to generate, based on the timing configuration, a time slot map identifying transmitting and receiving opportunities that enable simultaneous operation of the wireless systems while mitigating interference between the wireless systems.

In yet another aspect, a computer readable medium tangibly stores code for simultaneously operating a short-ranged time division duplex (TDD) mobile wireless system (MWS) with a mobile wireless broadband system. The medium includes code that determines a timing configuration of the mobile wireless broadband system. The medium also includes code that generates, based on the timing configuration, a time slot map identifying transmitting and receiving opportunities that enable simultaneous operation of the wireless systems while mitigating interference between the wireless systems.

In a further aspect, a system for simultaneous operation of a short-ranged time division duplex (TDD) mobile wireless system (MWS) with a mobile wireless broadband system, the system has means for determining a timing configuration of the mobile wireless broadband system. The system also has means for generating, based on the timing configuration, a time slot map identifying transmitting and receiving opportunities that enable simultaneous operation of the wireless systems while mitigating interference between the wireless systems.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (ETA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
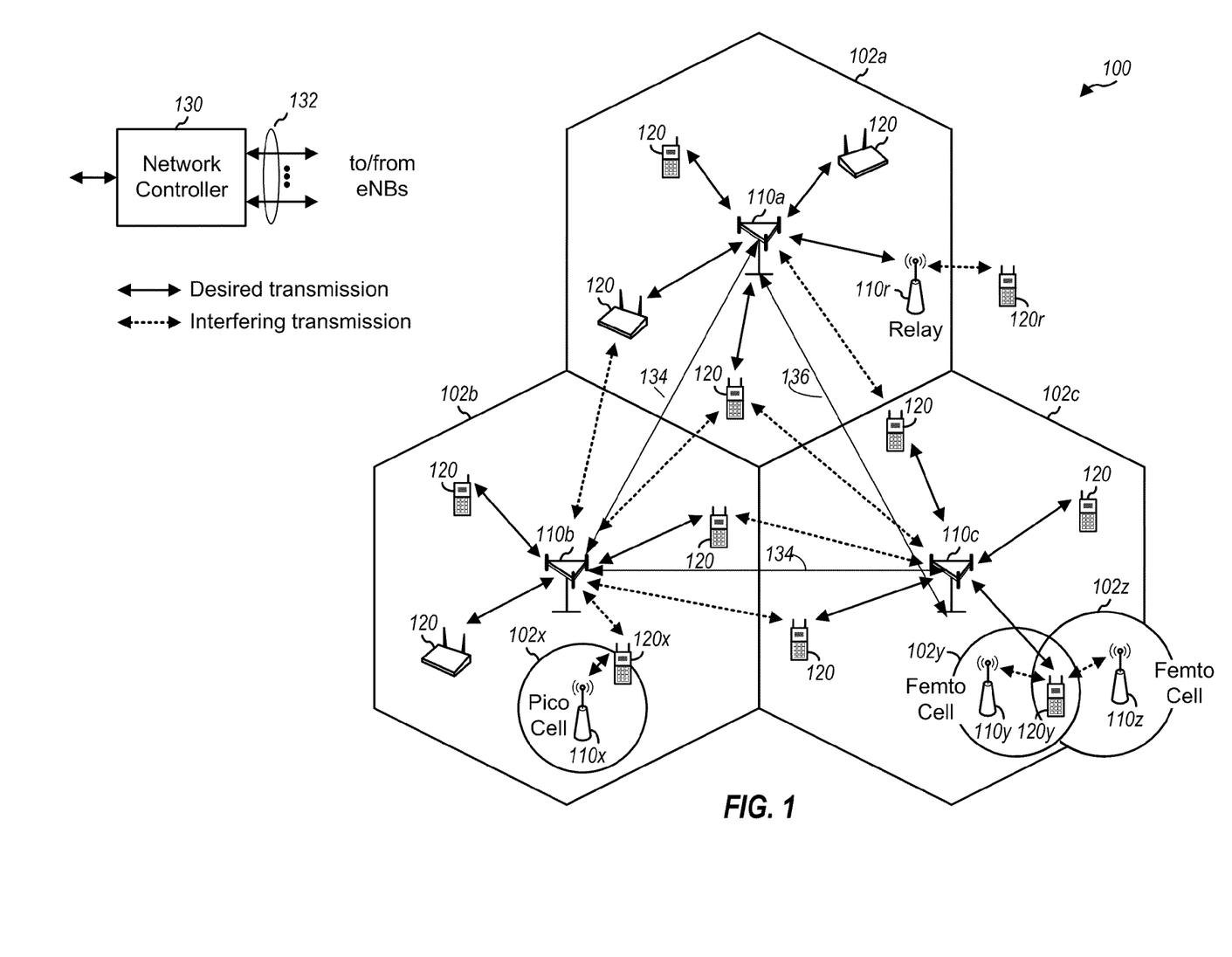
FIG. 1 is a block diagram conceptually illustrating an example of a mobile communication system.

FIG. 1 shows a wireless communication network 100, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for synchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, or 20 MHz, respectively.

Figure 2:
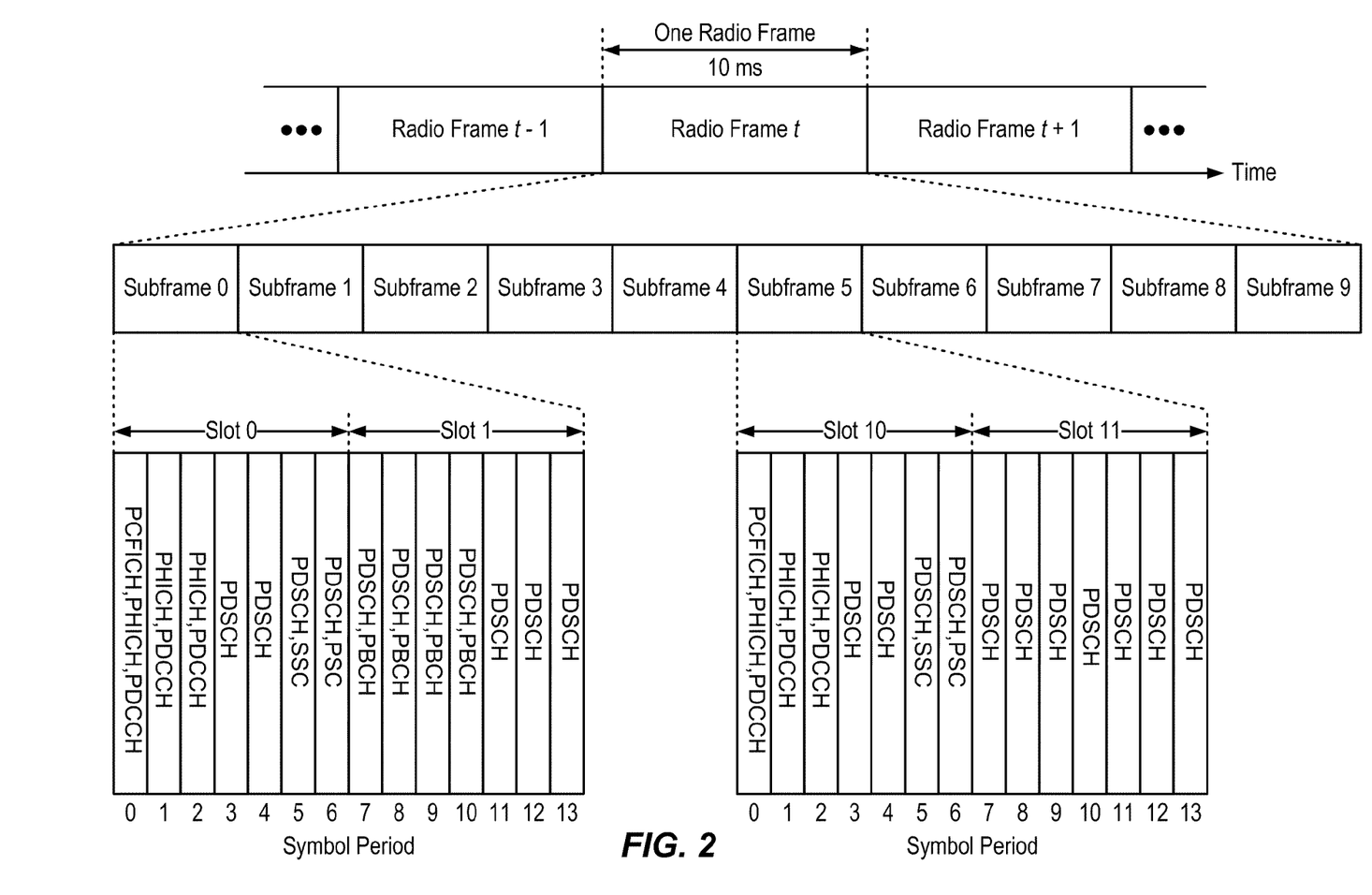
FIG. 2 is a block diagram conceptually illustrating an example of a downlink frame structure in a mobile communication system.

FIG. 2 shows a downlink FDD frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

Figure 3:
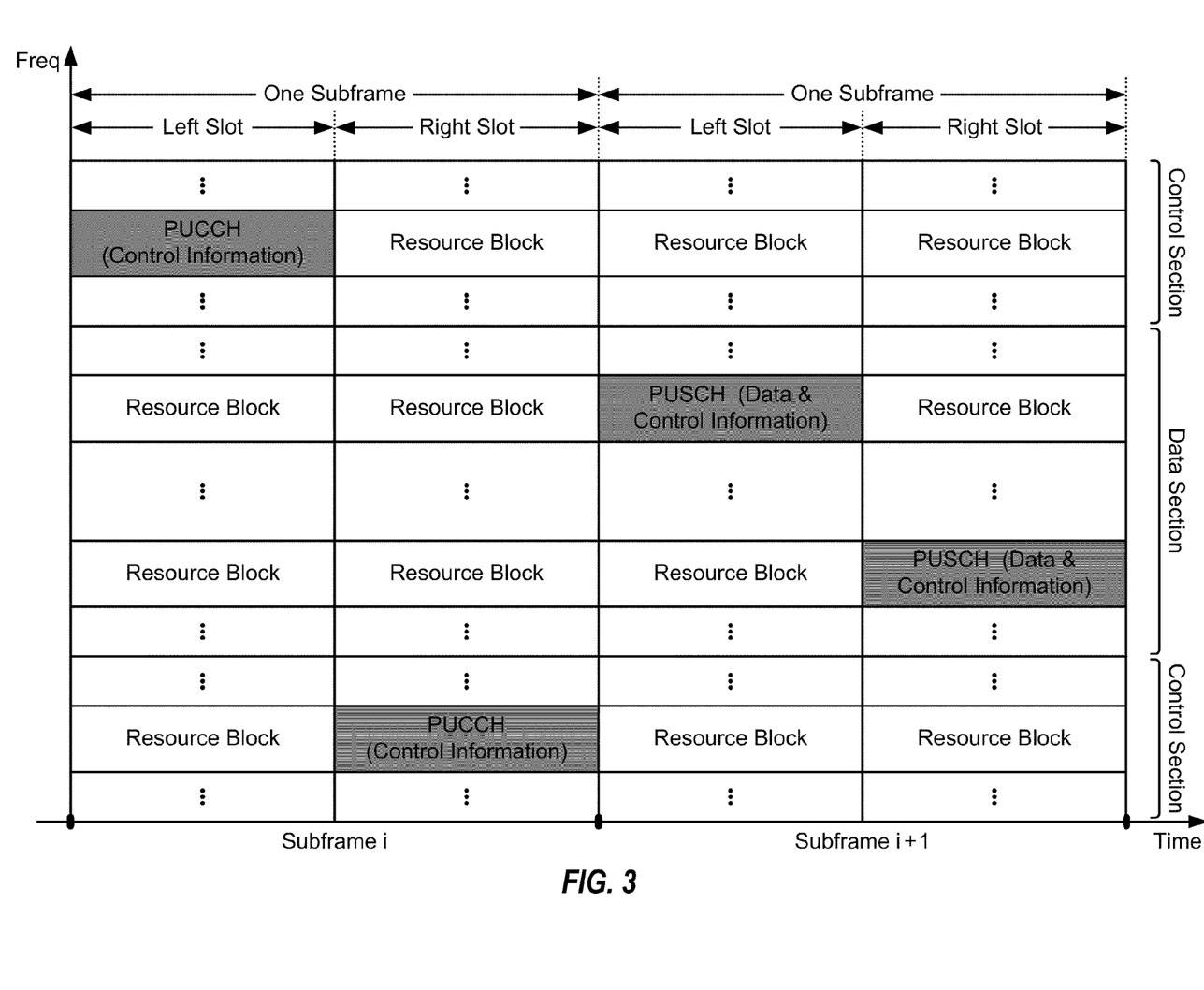
FIG. 3 is a block diagram conceptually illustrating an exemplary frame structure in uplink communications.

A UE may be within the coverage of multiple eNodeBs. One of these eNodeBs may be selected to serve the UE. The serving eNodeB may be selected based on various criteria such as received power, path loss, signal-to-noise ratio (SNR), etc FIG. 3 is a block diagram conceptually illustrating an exemplary frame structure in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3.

The PSS, SSS, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
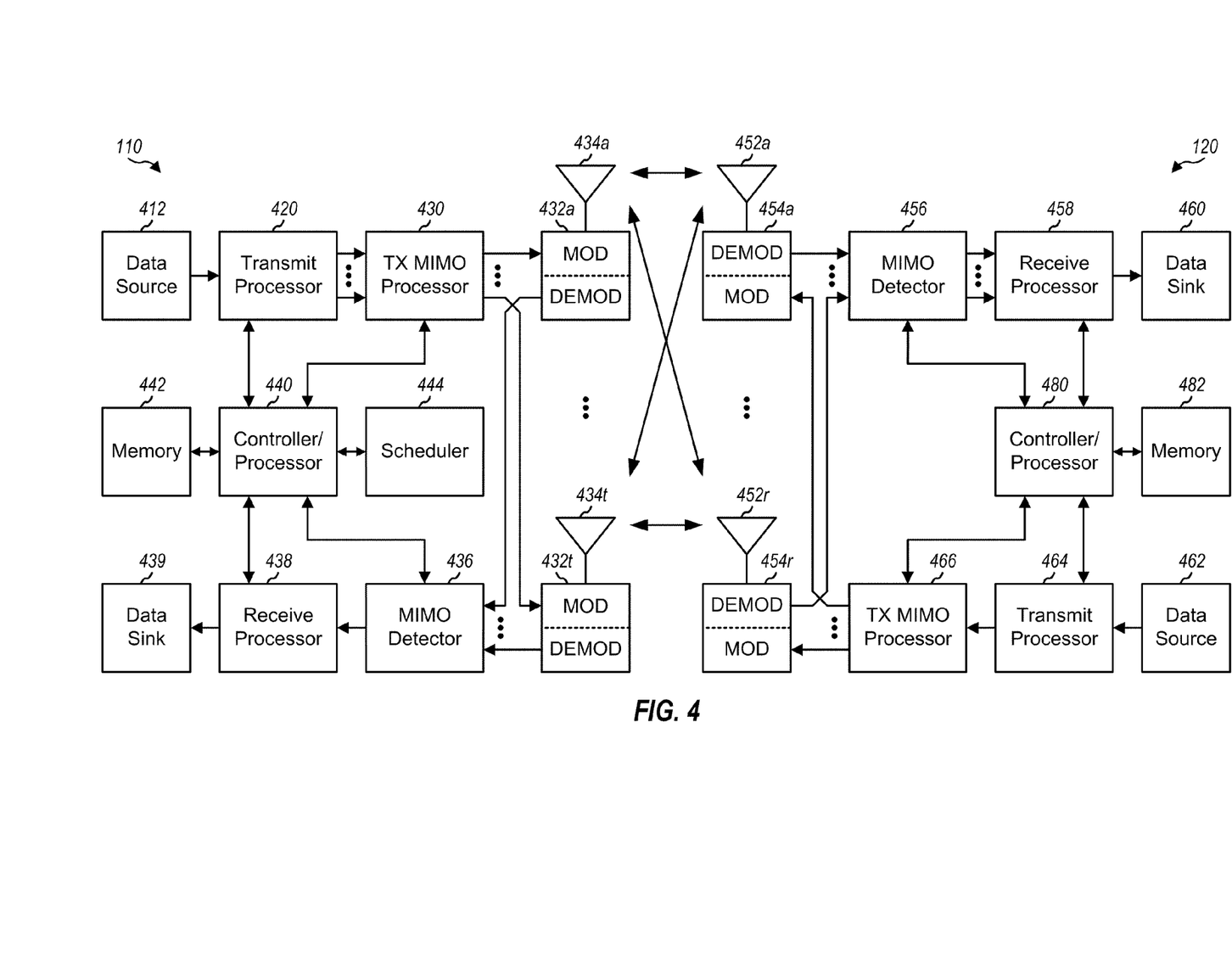
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIG. 8, and/or other processes for the techniques described herein. The memories 442 and 482 may store data and program codes for the base station 110 and the UE 120, respectively. A scheduler 444 may schedule UEs for data transmission on the downlink and/or uplink.

LTE/-A networks can implement mobile wireless broadband systems and provide both frequency division duplex (FDD) and TDD operations. Other mobile wireless broadband systems, such as WiMAX, also offer TDD operations. From the TDD perspective, LTE/-A and WiMAX systems are very similar and each uses a very similar generic TDD frame structure. As used herein, mobile wireless broadband systems will refer to systems having similar TDD frame structures for TDD operations, such as LTE/-A, WiMAX, and the like.

In operating a heterogeneous network with mobile wireless broadband systems, simultaneous operations with other short-ranged TDD systems is contemplated. One example of such a short-ranged TDD system is Bluetooth SIG's BLUETOOTH™ wireless protocol. However, many such short-ranged TDD systems are assigned with transmission and reception frequencies that will interfere with the uplink and downlink transmissions of mobile wireless broadband systems. In BLUETOOTH™ systems, for example, the receiver frequencies (i.e., the transmission frequencies of the BLUETOOTH™ device communicating with the UE) will interfere with the downlink transmissions received by the UE of a mobile wireless broadband system, such as and LTE/-A or WiMAX system, while the BLUETOOTH™ transmitter frequencies interfere with the uplink transmissions of the UE. However, many short-ranged TDD system receiver frequencies, including those in BLUETOOTH™, may operate together with the mobile wireless broadband system downlink transmissions without interference and the transmitter frequencies of these short-ranged TDD system may operate together with the mobile wireless broadband system uplink transmissions without interference. Therefore, in one aspect of the present disclosure, the transmission and reception of both systems are aligned in such a manner that the short-ranged TDD system transmission does not overlap into the mobile wireless broadband system receiving time, and the mobile wireless broadband system transmission time does not overlap into the short-ranged TDD system receiving time.

Figure 5:
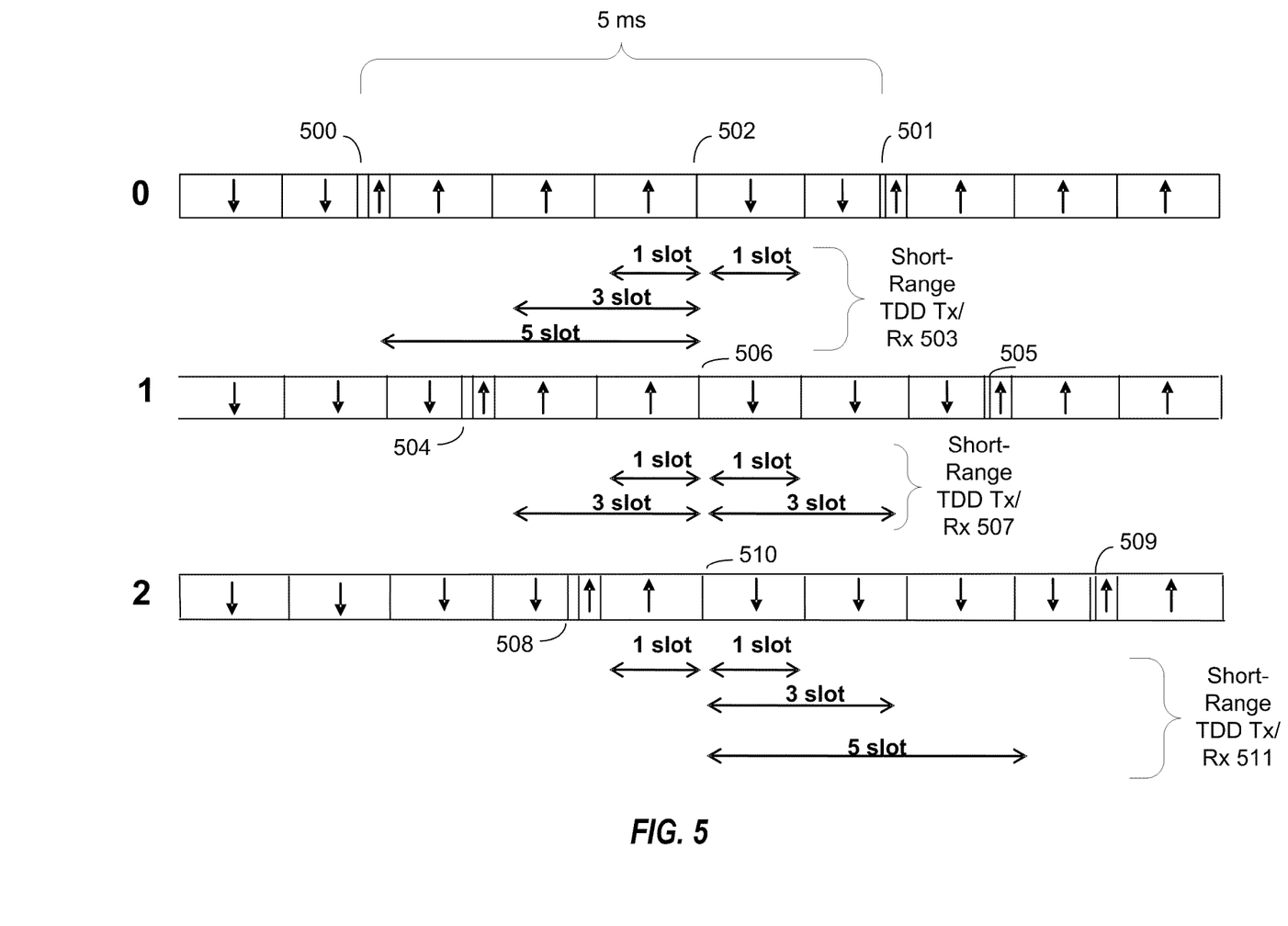
FIG. 5 is a block diagram conceptually illustrating three different configurations of TDD frame structures 0-2 of a mobile wireless broadband system configured according to one aspect of the present disclosure.

FIG. 5 is a block diagram conceptually illustrating three different configurations of TDD frame structures 0-2 of a mobile wireless broadband system configured according to one aspect of the present disclosure. Each of the TDD frame structures 0-2 are divided into 10 subframes that may be reserved for uplink communications, downlink communications, or a special subframe that includes a downlink time slot and an uplink time slot with a guard band between the downlink and uplink slots. The timing between each guard band is 5 ms. Referring to TDD frame structure 0, the time between guard band 500 and 501 is 5 ms. The configuration of the TDD frame structure 0 has an initial two downlink slots, followed by the guard band 500, and followed by four uplink slots, before repeating the same sequence in the remainder of the five subframes. The differences between the TDD frame structure 0 and the frame structures 1 and 2 are the number of downlink slots versus the number of uplink slots. Thus, by selecting a particular frame structure configuration the mobile wireless broadband system is capable of addressing changes in uplink and downlink loads.

It should be noted that various mobile wireless broadband systems define multiple different TDD frame structure configurations that may be selected according to the appropriate load. The three configurations illustrated in FIG. 5 are merely representative of possible configurations in the mobile wireless broadband systems.

Many short-ranged TDD systems, such as BLUETOOTH™, are mostly ad hoc systems, in which communication between compatible devices occurs in a master and slave relationship. The short-ranged TDD systems compatible with the various aspects of the present disclosure are capable of varying the slot packet size of both transmitting and receiving sides. In general, a short-ranged TDD system may select slot packet sizes of 1, 3, and 5 slots. Moreover, when the master device transmits, the slave device, to which the master transmission was addressed, will transmit back to the master in the next time slot after the master transmission. Therefore, in order to operate simultaneously with a mobile wireless broadband system, the communication packet structure (i.e., the appropriate sizes of slot packets for master and slave communication) for a short-ranged TDD system will need to be aligned with the uplink/downlink transition boundary in the subframe configuration of the mobile wireless broadband system.

Referring again to FIG. 5, the TDD frame structure 0 experiences an uplink/downlink transition at the subframe boundary 502. With five transmission time slots and two receive slots available in the TDD frame structure 0 between the guard bands 500 and 501, a short-ranged TDD system may select to transmit any of 5, 3, or 1 slots, but, because only two receive slots are available, the short-ranged TDD system may only select to receive 1 slot from the slave device, as shown in the short-ranged TDD Tx/Rx slots 503. This division between transmit and receive slots is made because the short-ranged TDD system needs to align its transition between master transmission and slave transmission with the subframe boundary 502.

The configuration of the TDD frame structure 1 provides three uplink slots and three downlink slots between the guard bands 504 and 505, in which, aligning with the subframe boundary 506, the short-ranged TDD system may select for master transmission of either 1 or 3 slots and slave transmission of either 1 or 3 slots, as illustrated in the short-ranged TDD Tx/Rx slots 507. Similarly, the configuration of the TDD frame structure 2 provides only two uplink slots and 5 downlink slots between the guard bands 508 and 509. Aligning its transmissions with the subframe boundary 510, the short ranged TDD system may select only for the master device to transmit using 1 slot, while the slave device may select to transmit on either 1, 3, or 5 slots, as depicted in the short-ranged TDD Tx/Rx slots 511. Therefore, depending on the particular TDD frame structure in force within the mobile wireless broadband system, as long as the short-ranged TDD system selects the appropriate master and slave transmission slot selections in order to align at any of the subframe boundaries 502, 506, and 510, the mobile wireless broadband system and the short-range TDD system may operate simultaneously without causing interference.

Figure 6:
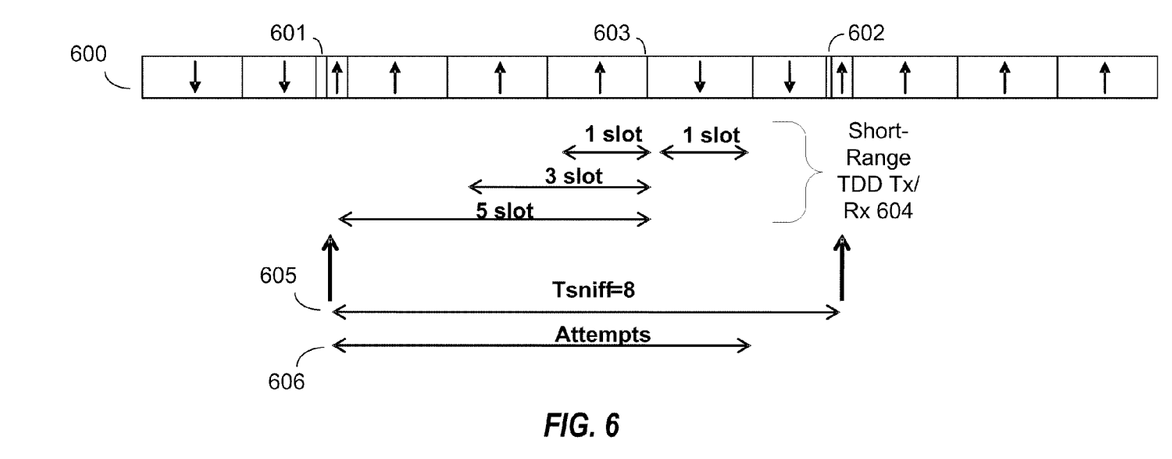
FIG. 6 is a block diagram conceptually illustrating a TDD subframe of a mobile wireless broadband system configured according to one aspect of the present disclosure.

Because the short-ranged TDD system communicates on an ad hoc basis, a consideration is made with regard to how to provide the appropriate slot selection information to the master/slave devices. FIG. 6 is a block diagram conceptually illustrating a TDD subframe 600 of a mobile wireless broadband system configured according to one aspect of the present disclosure. The configuration of the TDD subframe 600 includes five uplink slots and two downlink slots between the guard bands 601 and 602. With this subframe configuration, a short-ranged TDD system may provide for the master device selecting to transmit either 5, 3 , or 1 slots in order to align the slave transmission at the subframe boundary 603. The slave device may only select to transmit using 1 slot, as shown in the short-ranged TDD Tx/Rx slots 604.

In order to provide the appropriate subframe configuration information and the associated slot selection information, a slot map may be transmitted to the short-range TDD system device. Short-ranged TDD devices use various management protocols to control communications between them. For example, in BLUETOOTH™, a link manager controls communications between various BLUETOOTH™ devices and the link managers communicate with other link managers of other BLUETOOTH™ devices using a link manager protocol. The link manager protocol defines various protocol data units (PDUs) which are messages that contain various instructions for the receiving device.

Figure 7:
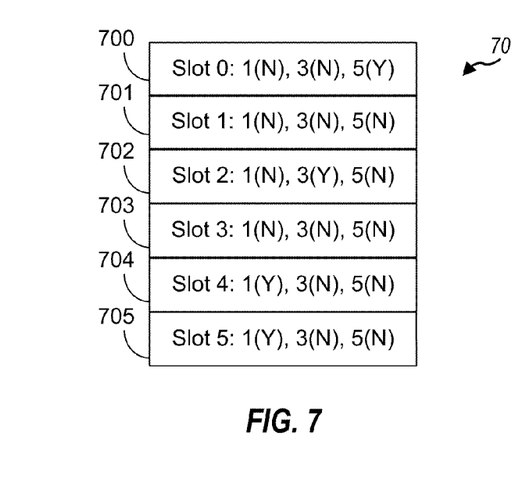
FIG. 7 is a table conceptually illustrating a slot map configured according to one aspect of the present disclosure.

FIG. 7 is a table conceptually illustrating a slot map 70 configured according to one aspect of the present disclosure. The slot map 70 corresponds to the configuration of the TDD subframe 600 (FIG. 6). In establishing communication between the master and slave devices, the master device transmits the slot map 70 to the slave device in a management protocol message. The slot map 70 contains a detailed set of information that provides slot size selection information for each of the slots in the communication portion of the TDD subframe 600 (FIG. 6). In row 700, the mapping information for Slot 0 is provided. Because of the configuration of the TDD subframe 600 (FIG. 6), only the master device may transmit during Slots 0-4. In Slot 0, because there are five uplink slots available, the master may only select to transmit using a 5-slot packet, 5(Y). In row 701, the Slot 1 information provides that neither the master device nor the slave device may transmit. In row 702, the Slot 2 information provides that the master device may only transmit using a 3-slot packet, 3(Y). In row 703, the Slot 3 information again provides that neither the master device nor the slave device may transmit. In row 704, the Slot 4 information provides that the master device may only transmit using a 1-slot packet, 1(Y). In row 705, the Slot 5 information now covers the slots during which the slave device may transmit. Because the configuration of the TDD subframe 600 (FIG. 6) only provides for two downlink slots before the ending guard band 602 (FIG. 6), the slot selection information provides that the slave device may only transmit using a 1-slot packet, 1(Y).

It should be noted that when the aspects of the present disclosure illustrated in FIGS. 6 and 7 are implemented using BLUETOOTH™ as the short-range TDD system, the slot map 70 may be transmitted from the master to the slave device in a link manager protocol PDU. Moreover, in order to restrict the transmission periods of the devices to the slots of the TDD subframe 600 between the guard bands 601 and 602, and schedule the slave transmission after the subframe boundary 603, the BLUETOOTH™ sniff or sniff subrating functionality may be used. Sniff and sniff subrating are power savings mechanisms in BLUETOOTH™ that specify a period of time within which the devices may stay connected and synchronized without being constantly in an active communication mode. The BLUETOOTH™ devices negotiate when the sniff is to occur and will go to sleep until that sniff period, when they may exchange various communications.

For purposes of the various aspects of the present disclosure implementing the short-range TDD system with BLUETOOTH™, the sniff mode would be used to define the communication period between the two devices. The sniff period, $T_{sniff}$ 605, would be set to 8 in order to cover the 5 ms period between anchor points at the guard bands 601 and 602, with the number of attempts 606 set to 3, in order to end the attempts by the time slot after the subframe boundary 603, and a timeout period set to 0. Using these features and settings, the master and slave devices will be able to synchronize their clocks and align the slave transmission time along the subframe boundary 603 in order to avoid master/slave transmission and uplink/downlink overlap.

Figure 8:
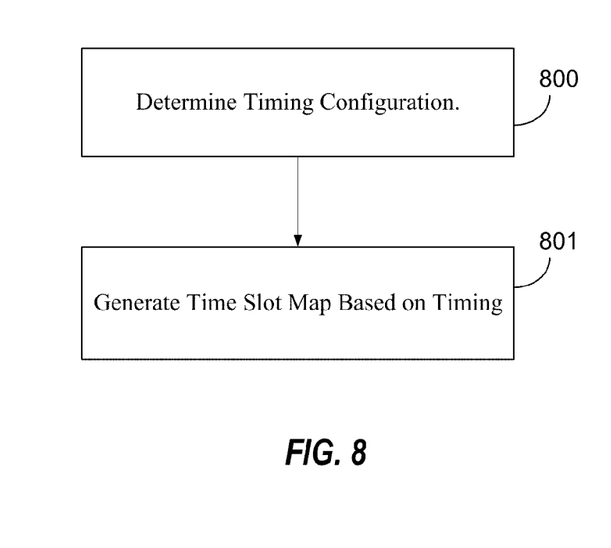
FIG. 8 is a functional block diagram illustrating example blocks executed to implement on aspect of the present disclosure.

FIG. 8 is a functional block diagram illustrating example blocks executed to implement on aspect of the present disclosure. In block 800, a timing configuration of a mobile wireless broadband system is determined. A time slot map is generated, in block 801, based on the timing. The time slot map identifies packet length (i.e., slot-size) selection information for each slot in the determined TDD frame configuration available for simultaneous operation. The packet length selection information provides alignment between a communication packet structure of the short-ranged TDD system and an uplink/downlink boundary of the TDD frame configuration. In one embodiment, the time slot map is transmitted to a short-ranged TDD device.

The simultaneous communications may occur between a UE having co-located transceivers for both the mobile wireless broadband system and short-ranged TDD system and a short-ranged TDD device, or between two short-ranged TDD devices that are within an area where interference may be caused by neighboring communications in the mobile wireless broadband system.

Figure 9:
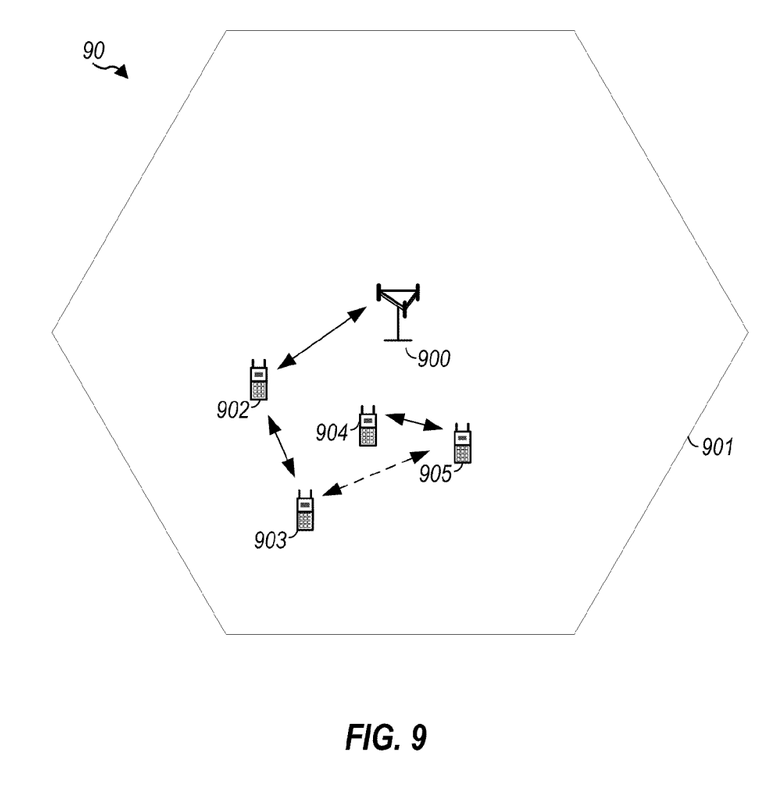
FIG. 9 is a block diagram conceptually illustrating an LTE-A network configured according to one aspect of the present disclosure.

FIG. 9 is a block diagram conceptually illustrating an LTE-A network 90 configured according to one aspect of the present disclosure. The LTE-A network 90 includes a macro base station 900 providing communication coverage in a cell 901. A UE 902 is compatible with the LTE-A network 90 and maintains communication with the macro base station 900 using a TDD frame structure selected based on the current traffic load of the cell 901. The UE 902 also has a co-located BLUETOOTH™ transceiver capable of conducting short-ranged TDD wireless communication over BLUETOOTH™. A wireless device 903 is located within range of the UE 902 and is a compatible BLUETOOTH™ device.

In operation, the UE 902 desires to establish simultaneous communication with the wireless device 903. The UE 902 begins by determining the current TDD frame structure configuration being used within the LTE-A network 90. The UE 902 determines that the TDD frame structure in use is the TDD frame structure 1 (FIG. 5). Based on this frame configuration information, the UE 902 generates a slot map that provides packet length selection information for aligning the BLUETOOTH™ communication packet structure with the uplink/downlink boundary, i.e., subframe boundary 506 (FIG. 5), of the TDD frame structure 1 (FIG. 5). The slot map includes instructions for each slot available for simultaneous communication, i.e., the slots between the guard bands 504 and 505 (FIG. 5), instructing the communicating side of the BLUETOOTH™ communication which slot packet slot size to select for any given slot.

The UE 902 uses the link manager protocol to transmit a PDU establishing a sniff period, along with the number of attempts and timeout value, to the wireless device 903. The UE 902 also transmits the slot map using a PDU of the link manager protocol to the wireless device 903. Using the sniff instructions, the wireless device 903 sets it sniff/communication period to coincide with the time slots between the guard bands 504 and 505 (FIG. 5), and then uses the slot map when selecting the appropriate packet length corresponding to the particular current time slot. With a frame structure of the TDD frame structure 1 (FIG. 5), the master BLUETOOTH™ device, i.e., the UE 902, may select either a 1-slot packet or a 3-slot packet for master transmissions, and the wireless device 903 may also select either a 1-slot packet or a 3-slot packet for slave transmissions back to the UE 902. In this manner, the two sets of transmissions are synchronized and aligned with the uplink/downlink boundary of the subframe boundary 506 (FIG. 5), thus, avoiding debilitating interference.

Alignment and scheduling of BLUETOOTH™ transmission simultaneously within an LTE-A environment, such as the LTE-A network 90 is provided. A master device 905 is communicating with a slave device 904 using BLUETOOTH™ communications. The slave device 904 begins to experience interference caused by the LTE-A network 90 and transmits a request for scheduling to the master device 905. In one aspect of the present disclosure, the master device 905 detects and analyzes the interference levels to determine the frame structure currently in place within the LTE-A network 90. Using this determined frame structure, the master device 905 generates an appropriate slot map and transmits the slot map and the sniff instruction in PDUs using the link manager protocol to the slave device 904. The master device 905 and the slave device 904 then establish their active communication period corresponding with the appropriate time slots of the determined frame structure to align and schedule communication according to the uplink/downlink communication boundaries of the LTE-A network 90.

In an alternative aspect of the present disclosure, instead of measuring and analyzing the interference levels, the master device 905 communicates with another BLUETOOTH™ device, the wireless device 903, polling for any information on the LTE-A frame structure in place. Because the wireless device 903 is in on-going communications with the UE 902 using the scheduling based on the LTE-A frame structure, the master device 905 is able to obtain the slot map and current frame structure configuration in order to align communication with the uplink/downlink communication boundaries of the LTE-A network 90.

In one configuration, the UE 120 configured for wireless communication includes means for determining and means for generating. In one aspect, the aforementioned means may be the processor(s), the controller/processor 480, and the memory 482, configured to perform the functions recited by the aforementioned means. In another aspect, the aforementioned means may be a module or any apparatus configured to perform the functions recited by the aforementioned means. The controller/processor 480 and the memory 482 could be implemented in a BLUETOOTH™ radio or in a multifunction chip providing BLUETOOTH™ and wireless broadband service (e.g., LTE). In one embodiment, the functionality is embodied in a single chip. In another embodiment the functionality is embodied across multiple chips.

Figure 10:
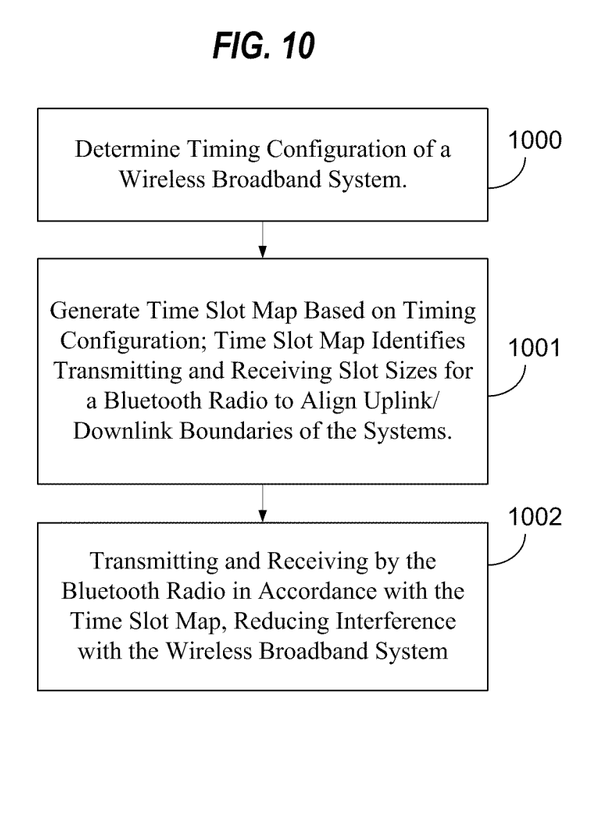
FIG. 10 is a functional block diagram illustrating example blocks executed to implement on aspect of the present disclosure.

FIG. 10 is a functional block diagram illustrating example blocks executed to implement on aspect of the present disclosure. In block 1000, a timing configuration of a mobile wireless broadband system is determined. A time slot map is generated, in block 1001, based on the timing. The time slot map identifies packet length (i.e., slot-size) selection information for each slot in the determined TDD frame configuration available for simultaneous operation. The packet length selection information provides alignment between a communication packet structure of the short-ranged TDD system and an uplink/downlink boundary of the TDD frame configuration. In one embodiment, the time slot map is transmitted to a short-ranged TDD device. At block 1002, the BLUETOOTH™ radio transmits and receives in accordance with the time slot map. Thus, interference between BLUETOOTH™ communications and wireless broadband communications is reduced because uplink communication of each system does not overlap with downlink communication of the other system and vice versa.

The simultaneous communications may occur between a UE having co-located transceivers for both the mobile wireless broadband system and short-ranged TDD system and a short-ranged TDD device, or between two short-ranged TDD devices that are within an area where interference may be caused by neighboring communications in the mobile wireless broadband system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 8 may be processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for simultaneous operation of a short-ranged time division duplex (TDD) mobile wireless system (MWS) with a mobile wireless broadband system, the method comprising:
   determining, on a wireless communication device, a timing configuration of the mobile wireless broadband system;
   generating, on a wireless communication device, based on the timing configuration, a time slot map identifying transmitting and receiving opportunities that enable simultaneous operation of the wireless systems within at least one time slot while mitigating interference between the wireless systems;
   setting sniff anchor points based on guard bands of the timing configuration so short-ranged TDD MWS packets align with the guard bands; and
   transmitting a message to a remote short-ranged TDD MWS device, the message setting an active communication period for the remote short-ranged TDD MWS device equal to a time period between successive guard bands in the timing configuration.

2. The method of claim 1, in which the time slot map comprises packet length selection information aligning a communication packet structure of the short-ranged TDD system and an uplink/downlink boundary of the timing configuration between the wireless systems.

3. The method of claim 1 in which the determining, and the generating occur at a multi-system device, the multi-system device communicating on the mobile wireless broadband system and communicating with a remote short-ranged TDD MWS device on the short-ranged TDD MWS.

4. The method of claim 1 in which the determining comprises:
sensing an interference pattern indicative of the timing configuration, in which the sensing and the generating occur at a second short-ranged TDD MWS device in communication with a first short-ranged TDD MWS device.

5. The method of claim 1:
in which the short-ranged TDD MWS comprises a BLUETOOTH® system; and in which the mobile wireless broadband system comprises one of:
a long term evolution (LTE) network; and
a WiMAX network.

6. An apparatus for simultaneous operation of a short-ranged time division duplex (TDD) mobile wireless system (MWS) with a mobile wireless broadband system, the apparatus comprising:
a memory; and
at least one processor coupled to the memory, wherein the at least one processor:
determines a timing configuration of the mobile wireless broadband system;
generates, based on the timing configuration, a time slot map identifying transmitting and receiving opportunities that enable simultaneous operation of the wireless systems within at least one time slot while mitigating interference between the wireless systems;
sets sniff anchor points based on guard bands of the timing configuration so short-ranged TDD MWS packets align with the guard bands; and
transmits a message to a remote short-ranged TDD MWS device, the message setting an active communication period for the remote short-ranged TDD MWS device equal to a time period between successive guard bands in the timing configuration.

7. The apparatus of claim 6 in which the at least one processor determines by sensing an interference pattern indicative of the timing configuration.

8. The apparatus of claim 6 in which the short-ranged TDD MWS comprises a BLUETOOTH® system; and
in which the mobile wireless broadband system comprises one of:
a long term evolution (LTE) network; and
a WiMAX network.

9. The apparatus of claim 6, in which the time slot map comprises packet length selection information aligning a communication packet structure of the short-ranged TDD system and an uplink/downlink boundary of the timing configuration between the wireless systems.

10. A non-transitory computer readable medium tangibly storing code for simultaneously operating a short-ranged time division duplex (TDD) mobile wireless system (MWS) with a mobile wireless broadband system, the medium comprising:
code that is executed by a processor to determine a timing configuration of the mobile wireless broadband system;
code that is executed by a processor to generate, based on the timing configuration, a time slot map identifying transmitting and receiving opportunities that enable simultaneous operation of the wireless systems within at least one time slot while mitigating interference between the wireless systems;
code that is executed by a processor to set sniff anchor points based on guard bands of the timing configuration so short-ranged TDD MWS packets align with the guard bands;
code that is executed by a processor to transmit a message to a remote short-ranged TDD MWS device, the message setting an active communication period for the remote short-ranged TDD MWS device equal to a time period between successive guard bands in the timing configuration.

11. The medium of claim 10, in which the time slot map comprises packet length selection information aligning a communication packet structure of the short-ranged TDD system and an uplink/downlink boundary of the timing configuration between the wireless systems.

12. The medium of claim 10 in which the determining code comprises code that is executed by a processor to sense an interference pattern indicative of the timing configuration.

13. The medium of claim 10 in which the short-ranged TDD MWS comprises a BLUETOOTH® system; and
in which the mobile wireless broadband system comprises one of:
a long term evolution (LTE) network; and
a WiMAX network.

14. A system for simultaneous operation of a short-ranged time division duplex (TDD) mobile wireless system (MWS) with a mobile wireless broadband system, the system comprising:
means for determining a timing configuration of the mobile wireless broadband system;
means for generating, based on the timing configuration, a time slot map identifying transmitting and receiving opportunities that enable simultaneous operation of the wireless systems within at least one time slot while mitigating interference between the wireless systems;
means for setting sniff anchor points based on guard bands of the timing configuration so short-ranged TDD MWS packets align with the guard bands; and
means for transmitting a message to a remote short-ranged TDD MWS device, the message setting an active communication period for the remote short-ranged TDD MWS device equal to a time period between successive guard bands in the timing configuration.

15. The system of claim 14, in which the time slot map comprises packet length selection information aligning a communication packet structure of the short-ranged TDD system and an uplink/downlink boundary of the timing configuration between the wireless systems.

* * * * *